US012737379B1

(12) United States Patent
Wang et al.

(10) Patent No.: US 12,737,379 B1
(45) Date of Patent: Sep. 15, 2026

(54) EXTRACTING DATA FROM LAB REPORTS USING GENERATIVE ARTIFICIAL INTELLIGENCE

(71) Applicant: Schlumberger Technology Corporation, Sugar Land, TX (US)

(72) Inventors: Kang Wang, Houston, TX (US); Clare Schoene, Houston, TX (US); Sreekrishnan Ramachandran, Houston, TX (US); Juan C. Alvarado, Houston, TX (US); Juan Alvarez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/081,007

(22) Filed: Mar. 17, 2025

(51) Int. Cl.
*G06F 16/25* (2019.01)

(52) U.S. Cl.
CPC .................................. *G06F 16/258* (2019.01)

(58) Field of Classification Search
None
See application file for complete search history.

(56) References Cited

U.S. PATENT DOCUMENTS

2021/0255163 A1* 8/2021 Rankin ................... C23F 11/00
2022/0027610 A1* 1/2022 Desai ..................... G06V 30/40
2024/0354322 A1* 10/2024 Mukherjee .......... G06F 16/3344
2024/0370709 A1* 11/2024 Siebel .................. G06N 3/0475
2025/0149126 A1 5/2025 Sauerer
2025/0209204 A1* 6/2025 Villanueva Cañizares .................. G06F 40/151
2026/0099685 A1* 4/2026 Tong ....................... G06F 40/40

OTHER PUBLICATIONS

"Azure Document Intelligence in Foundry Tools", Retrieved from the internet: https://azure.microsoft.com/en-us/products/ai-foundry/tools/document-intelligence, Retrieved date: Apr. 1, 2026, pp. 1-8.
"Optical character recognition", Retrieved from the internet: https://en.wikipedia.org/wiki/Optical_character_recognition, Jan. 21, 2026, pp. 1-12.

* cited by examiner

*Primary Examiner* — Amresh Singh
(74) *Attorney, Agent, or Firm* — Kyle R. Miiller

(57) ABSTRACT

A lab report data extraction system may identify a plurality of lab reports from a lab report repository, each of the plurality of lab reports including a plurality of data fields. A lab report data extraction system may identify a plurality of output data fields. A lab report data extraction system may generate a prompt for a generative artificial intelligence (AI) model, the prompt including a request for the generative AI model to identify the output data fields from the plurality of data fields. A lab report data extraction system may input the prompt to the generative AI model, the generative AI model preparing an output including data from the plurality of data fields output to the plurality of output data fields in a formatted database.

22 Claims, 8 Drawing Sheets

EXTRACTING DATA FROM LAB REPORTS USING GENERATIVE ARTIFICIAL INTELLIGENCE

BACKGROUND OF THE DISCLOSURE

Oil and gas systems sample various fluids and perform laboratory tests on the fluids to determine the fluid properties. The results of these laboratory tests are recorded in lab reports, which are then used in various elements of oil and gas extraction, collection, and transportation. For instance, tests are performed to analyze the impact of various additives on fluids. Historical lab reports are stored in a repository that stores a large amount of lab report files. But the various lab reports may have inconsistencies in report format, including language, templates, naming convention, lab procedure differences, changes over time, and so forth. This may result in a repository, rather than an analytical database that enables making analytical use of the data inside these report files. Over time, the repository may collect an unwieldy number of lab reports stored in disparate data formats. It is a non-trivial task to turn even a portion of the report repository into a database having consistent formatting. For instance, the report repository may be analyzed by human operators, which is time-consuming and prone to error.

SUMMARY

In some aspects, the techniques described herein relate to a method for retrieving data from a lab report repository. A lab report data extraction system identifies a plurality of lab reports from a lab report repository. Each of the plurality of lab reports includes a plurality of data fields. The lab report data extraction system identifies a plurality of output data fields. A prompt generator generates a prompt for a generative artificial intelligence (AI) model. The prompt includes a request for the generative AI model to identify the output data fields from the plurality of data fields. The prompt is input to the generative AI model. The generative AI model prepares an output including data from the plurality of data fields output to the plurality of output data fields in a formatted database.

In some aspects, the techniques described herein relate to a method for retrieving data from a lab report repository. A lab report data extraction system generates a prompt for a generative artificial intelligence (AI) model. The prompt includes a request for the generative AI model to retrieve data from a plurality of lab reports. The prompt is input to the generative AI model. The generative AI model prepares an output including the data.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
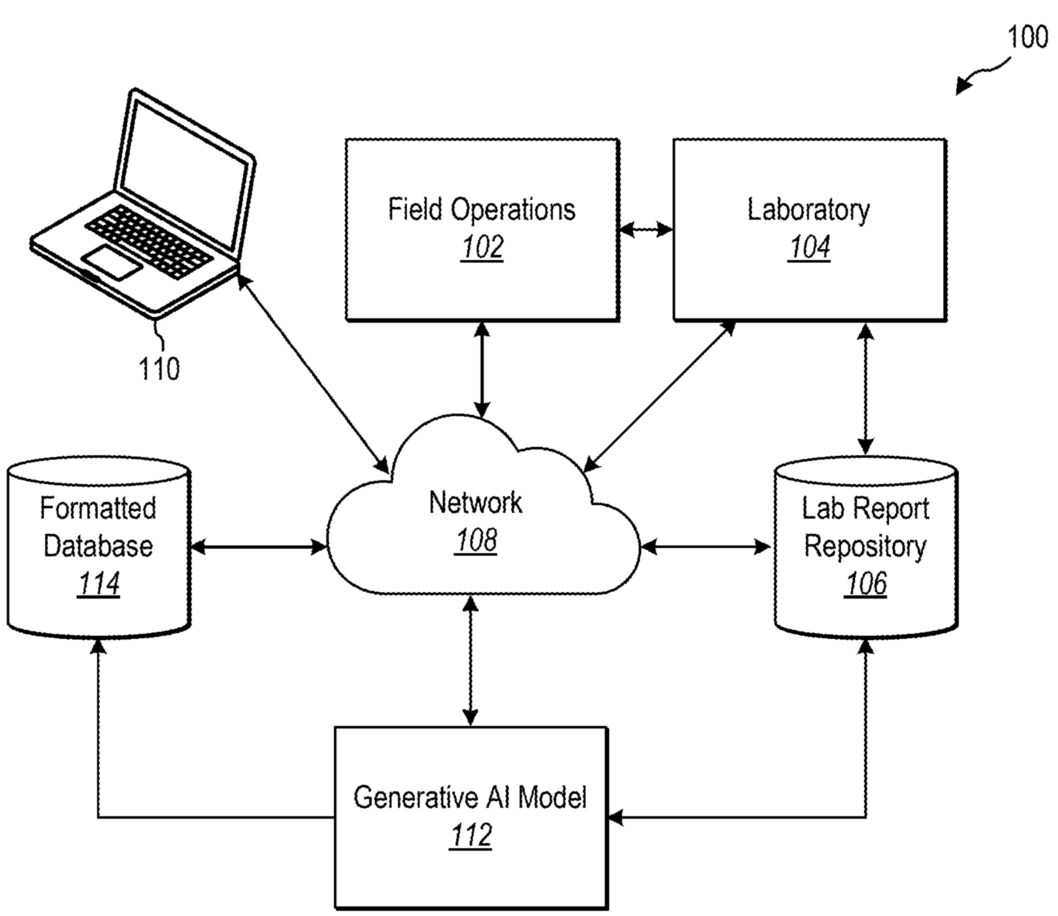
FIG. 1 is a schematic representation of a lab report data extraction system, according to at least one embodiment of the present disclosure.

This disclosure generally relates to devices, systems, and methods for extracting data from lab reports having irregular formatting, content, languages, layout, and other irregularities. For example, a laboratory may perform an analysis of a fluid to identify its physical properties, chemical properties, thermodynamic properties, chemical makeup, and so forth. The analysis may be recorded in a lab report. However, different laboratories may generate different reports. The generated lab reports may be different in any manner, including language, units, formatting, document type, measured parameters, and so forth. Individual lab reports may be generated for a particular reason, such as a report to a client or technician preference. Further, different laboratories may generate different lab reports, having different formats, content, or arrangements. In some situations, lab report formatting and/or content may change over time, such as based on new procedures, additives, or products.

In some situations, an operator may desire to collect information from different lab reports. For example, an operator may desire to review previously collected information regarding a fluid produced from a wellbore. To collect this information, the operator may retrieve the identified report, visually examine the report, and record the data in a new location. Such a process may result in errors due to human fallibility and/or expend a significant amount of resources in terms of worked hours and associated costs.

Conventionally, automation of data extraction involves utilizing specialized data recognition software. Such software may recognize text or numbers in a pre-determined analysis zone. For example, a lab report may have a format that is standardized for a particular laboratory or set of laboratories, with particular data fields at particular locations across multiple lab reports. The data recognition software may receive the location of the data field. The data recognition software may extract the information from the location and label the extracted information based on the data field associated with that location. The data recognition software may extract the data from the data fields based on pre-determined data formats, such as text, numbers, and so forth. However, such data recognition software may rigidly identify data based on the input parameters, including data field location and data type. As discussed herein, different lab reports may include different data, data in different locations, different data formats, different document formats, and so forth. The data extraction software may fail to accommodate such differences in lab reports, thereby extracting inaccurate, incorrect, or otherwise irrelevant information. In some situations, the change in lab reports may result in a failure to extract any recognizable data.

In accordance with at least one embodiment of the present disclosure, a lab report data extraction system may utilize a generative artificial intelligence (AI) model to extract lab data from different lab reports. For example, the lab report data extraction system may apply a generative AI model to lab reports having different data formats to extract requested output data in a predetermined data format. The generative AI model may identify the requested output data in the data fields of the lab reports and extract the data into the predetermined data format. This may result in an accurate identification of the requested output data, including accurate identification from multiple different types or formats of lab reports.

The lab report data extraction system may generate a prompt to apply to the generative AI model. For example, the lab report data extraction system may receive the requested output data fields from the operator. A prompt generator may generate a prompt to input to the generative AI model instructing the generative AI model to extract the requested output data. In some embodiments, the requested output data may be a subset of the data fields in the lab reports, or may include less than all of the data in the report. In some embodiments, the prompt may include an identification of the formatting of the requested output data. In some embodiments, the prompt may be generated agnostic of the type of lab report. For example, the prompt may request a particular output data, including the data type, without identifying details from the lab report regarding the output data, including location, formatting, language, and so forth.

The generative AI model may receive the prompt as input and extract data from the various lab reports based on the prompt. In some embodiments, the generative AI model may retrieve the lab reports from a report repository. The report repository may include multiple different types of lab reports. In some embodiments, the prompt may include the lab reports from which the generative AI model is to extract data, and the generative AI model may retrieve the identified reports. In some embodiments, the prompt may not include any identification of particular lab reports, and the generative AI model may search the report repository for lab reports relevant or responsive to the prompt. In some embodiments, the generative AI model may analyze each lab report in the report repository.

The generative AI model may output the extracted data in a formatted database. The formatted database may include output data fields including output data that the generative AI model extracted from the lab reports in the report repository. In some embodiments, the formatted database may include data intended for use in a particular model. For example, one or more product recommendation models may use and/or be trained by the formatted database. The product recommendation models may prepare product recommendations to adjust properties of the fluid, including the prevention of the formation of compounds or other materials that may reduce the flowability of the fluid and/or the functionality of a pipeline. In this manner, the lab report data extraction system may be used to extract data and generate insights from data from multiple labs, over multiple years, and from lab reports having multiple different formats.

As illustrated by the foregoing discussion, the present disclosure utilizes a variety of terms to describe features and advantages of the lab report data extraction system. Additional detail is now provided regarding the meaning of such terms. For example, as used herein, the term "lab report" refers to the recorded collection of, analysis of, conclusions drawn from, and other processing of data. In particular, the term "lab report" can include the records resulting from any collection, analysis, and processing of data, including any conclusions drawn from the data. For example, a lab report may include the recorded collection of data from the collection and analysis of a sample of a material. For example, a lab report may include the recorded collection of data from the analysis of a fluid. In some examples, a lab report may include the recorded collection of data from the analysis of a solid material, including solid deposition, precipitations, aggregations, agglomerations, and other collections of solid materials. In some examples, a lab report may include the recorded collection of data from the analysis of a gas. In some examples, a lab report may include the recorded collection of data from the analysis of a material including a mixture of two or three of a solid, a gas, and a fluid. In some examples, the material may be a material that has originated from a well drilled to extract hydrocarbons. To illustrate, a lab report can include any information collected during the analysis of a sample. Such information may include one or more of physical properties, chemical properties, or chemical composition. In some embodiments, the information may include field conditions, such as pressure information, temperature information, flowrate information, additive information, and so forth. In some embodiments, the information may include laboratory conditions, pressure information, temperature information, flowrate information, additive information, and so forth. In some embodiments, the information may include related tests, recommended inhibitors, inhibitor efficiency, dosage information, and so forth. In some embodiments, the information may include plain text, including prose descriptions of the sample, the testing apparatus, the testing process, and other operator impressions. In some embodiments, the information may include identification information, such as a well identifier, basin information, geological information, collection date, collection team, client information, and so forth (also referred to as "metadata"). As discussed herein, the information in the lab report may be organized or formatted in any manner, including different languages, units of measurement, arrangement, document file type, input format, and so forth.

The document format of a lab report may include the arrangement and/or storage of data in a lab report. Examples of lab reports having different document formats may include, without limitation, scientific documentation, scientific lab reports, experimental logs/reports, technical records, academic reports, analytical summaries, technical lab reports, research-oriented lab reports, industrial data logs, quality control lab reports, field study lab reports, clinical lab reports, data science lab reports, any other type of lab report, and combinations thereof. In some examples, the document format may be related to or associated with the various types of services offered, including, without limitation, reservoir evaluation lab reports, well testing lab reports, geochemical/subsurface analysis lab reports, environmental lab report, sustainability analysis lab report, drilling fluid testing lab reports, core analysis lab reports, production testing lab reports, corrosion and materials testing lab reports, petrochemical process lab reports, any other service-based lab report, and combinations thereof. In some examples, the document format of a material testing laboratory may vary based on the testing laboratory, the owner of the producing well (e.g., the client), the contractor performing a particular project, personal preferences by a technician, the type of testing performed, the geographical location of the testing laboratory (e.g., the geological basin, the country), any other variation reason, and combinations thereof.

As used herein, a "data field" may include a portion of a lab report and/or report output from a generative AI model that is associated with a particular type of information. For example, a "data field" may include a portion of a lab report in which a particular measurement is recorded. In some examples, a data field may include a portion of a report in which an additive type is recorded. In some examples, a data field may include a portion of a report in which identifying information related to a fluid sample is recorded. A data field may refer to an information type, regardless or independent of the units, values, language, location in a document, document type, or other report-specific element.

As used herein, a "fluid" may include a substance that is analyzed at a lab to produce a lab report. For instance, a "fluid" may include a single phase of matter, such as a gas or a liquid. In some embodiments, a fluid may include a combination of multiple materials and/or multiple phases of matter, such as a liquid having suspended solids, a liquid having entrained gas or solids, a liquid having gas bubbles, a gas having suspended liquid droplets or solid particles. The fluid may include a water-based fluid (e.g., a brine), an oil-based fluid (e.g., crude oil), a gas (e.g., natural gas), or a combination of two or three of the foregoing, including a mixture of water and oil, a mixture of water and gas, a mixture of oil and gas, or a mixture of water, oil, and gas. The fluid may include one or more compounds, including compounds dissolved in water, a mixture of different hydrocarbons, compounds dissolved in crude oil, or a mixture of two or more gases.

As used herein, the term "generative artificial intelligence model" (or "generative AI model") refers to a computational system that utilizes deep learning and a large number of parameters (e.g., billions or trillions for a large version and fewer for a small version) and is trained on one or more extensive datasets to produce coherent, contextually relevant, and fluent outputs (e.g., text and/or images) specific to a particular topic. In many cases, a generative AI model is an advanced computational system that uses natural language processing, machine learning, and/or image processing to generate human-like responses that are coherent and contextually relevant. For instance, generative AI models can create outputs in various formats, including one-word answers, long narratives, images, videos, labeled datasets, documents, tables, and presentations.

Moreover, generative AI models are primarily based on transformer architectures for understanding, generating, and manipulating human language. Generative AI models can also utilize other types of architectures such as recurrent neural network (RNN) architecture, long short-term memory (LSTM) model architecture, convolutional neural network (CNN) architecture, or other types of architectures. Examples of generative AI models include generative pre-trained transformer (GPT) models like GPT-3.5, GPT-4, and GPT-40, bidirectional encoder representations from transformers (BERT) models, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large language model (LLM), a small language model (SLM), a large action model (LAM), and a small action model (SAM), which serve as text-based versions of a generative AI model, such as those that receive text prompts and/or generate text outputs. In various implementations, a generative AI model is a multi-modal generative model that receives multiple input formats (e.g., text, images, video, data structures) and/or generates multiple output formats.

As used herein, a "prompt" includes an input to which a generative AI model is applied to produce an output. For instance, a "prompt" may include a query requesting information. The prompt may include context. For example, context in a prompt may identify the type of information, the location of the information, the source of the information, and so forth. In some embodiments, a prompt may specify a particular output, including details of the output such as formatting, file type, data type, units, language, and so forth. A prompt may be structured, unstructured, or a combination of structured and unstructured. For example, a structured prompt may include structured data that has information presented in a specific, predetermined format, such as data fields for particular data types. An unstructured prompt may include plain language, such as sentences or prose requesting information using spoken or written language syntax and grammar, and limited or no programming language syntax and grammar. A prompt including a combination of structured and unstructured data may include an explanation of a data table and the data table having specific data fields for specific information.

FIG. 1 is a schematic representation of a lab report data extraction system 100, according to at least one embodiment of the present disclosure. The lab report data extraction system 100 may facilitate the extraction of data from disparate lab reports. Lab reports are generated based on the analysis of fluid samples. As a specific, non-limiting example, fluid samples may be collected from one or more field operations 102. The field operations 102 may include any field operation in an oil and gas exploration and production system. For example, the field operations 102 may include wellbore drilling, wellbore completion, wellbore production, wellbore pipelines and associated equipment, any other field operations, and combinations thereof. An operator may collect fluid samples from the field operations 102. For example, the operator may collect a fluid sample of fluids pumped into and subsequently retrieved from a wellbore (e.g., drilling fluid or drilling mud, hydraulic fracturing fluid, artificial lift fluid). In some examples, the operator may collect a fluid sample of fluids produced by a wellbore, such as water and/or oil. While embodiments and examples of the present disclosure may discuss fluid samples and fluid analysis, it should be understood that the techniques of the present disclosure may be applied to any type of lab report. Indeed, as discussed herein, lab reports may be generated based on any experimental, testing, field service, research, or other facility that produces data, analyzes data, and generates results or outputs based on that data.

A laboratory 104 may receive the fluid sample from the field operations 102. The laboratory 104 may perform one or more tests on the fluid. For example, the laboratory 104 may perform tests to determine the composition of the fluid, the physical properties of the fluid, the chemical properties of the fluid, the effectiveness of chemical additives to the fluid, and so forth. In some examples, the laboratory 104 may analyze the impact of one or more additives on the fluid. For example, the laboratory 104 may analyze the impact of adding an inhibitor, such as a scale inhibitor, a corrosion inhibitor, an asphaltene inhibitor, a hydrate inhibitor, a paraffin inhibitor, a biocide inhibitor, any other inhibitor, and combinations thereof, including inclusions or exclusions of any of the foregoing.

In some embodiments, a single laboratory 104 may analyze the fluid sample collected from the field operations 102. In some embodiments, the field operations 102 may send the fluid sample to multiple laboratories 104, with different laboratories 104 performing different tests on the fluid sample.

The laboratory 104 may generate one or more lab reports associated with the tests performed on the fluid sample. The lab reports may include data stored in one or more data fields. For example, the lab reports may include the testing conditions, the testing results, and information associated with the source of the sample. In some embodiments, the field operations 102 may include field or operational information associated with collecting the fluid sample, such as temperatures, pressures, wellbore identification, wellbore location, relevant geology, collection equipment, collection crew, wellbore owner information, and so forth.

As discussed herein, the lab reports may be generated to inform operational decisions. For example, the lab reports may be generated to inform the selection of an additive to a fluid stream. Typically, when an operator desires to make an operational decision, the operator may request the collection and analysis of the fluid samples. However, such analysis may be expensive and time-consuming. The operator may desire to make the operational decision based on tests previously performed on other fluid samples, including fluid samples from similar wellbores and/or dissimilar wellbores.

Such previously performed tests may be stored in a report repository 106. The report repository 106 may include lab reports from a large number of laboratories 104, including laboratories having different equipment, personnel, ownership, located in different geological basins, countries, continents, or oceans, and so forth. As discussed herein, the resulting report repository 106 may have lab reports having different file formats, having hand-written information, having different arrangements of information, generated in different languages, using different units, collecting different information, being based on different tests, and so forth.

The field operations 102, the laboratory 104, and the report repository 106 may be connected over a network 108, such as the internet. For example, the field operations 102 may collect the sample, record information associated with the collection of the sample in a field report, and upload the field report to the report repository 106 over the network 108. The field operations 102 may physically deliver the fluid sample to the laboratory 104, and the laboratory 104 may generate the lab report and upload the lab report to the report repository 106 over the network 108. In some embodiments, the report repository 106 may be located on a remote server, such as a cloud server, and the field operations 102 and/or the laboratory 104 may upload the lab reports in real time to the report repository 106. In some embodiments, the field operations 102 and/or the laboratory 104 may upload the lab reports to the report repository 106 after completion of multiple lab reports, or when internet access is available to the operator. A user may access the lab reports from the report repository 106 using a user device 110 via the network 108. In some embodiments, the user may further be in communication with the field operations 102 and/or the laboratory 104 over the network 108.

In accordance with at least one embodiment of the present disclosure, a generative AI model 112 may extract information or data from the lab reports in the report repository 106. For example, the generative AI model 112 may receive a prompt to extract information from one or more lab reports in the report repository 106. In some examples, the generative AI model 112 may receive a prompt to extract information from multiple lab reports having different information, formats, file types, and so forth. The generative AI model 112 may, based on the prompt, analyze the lab reports from the report repository 106 and extract the associated data.

The generative AI model 112 may extract the requested data based on an input from a user at the user device 110. For example, the user may request output data fields to be extracted by the generative AI model 112. The output data fields may include any measured aspect of a fluid sample and/or results of a test. In some embodiments, the output data fields may include less information than may be included in one or more of the lab reports from the report repository 106. The generative AI model 112 may output the requested information in a formatted database 114. The formatted database 114 may include the extracted data structured with the same structure and/or structured as requested by the user. This may improve the accuracy and/or relevance of the resulting analysis of the extracted data.

As a specific, non-limiting example, a user may desire to extract the water chemistry of the fluid sample and the impact of corrosion inhibitors. The laboratory 104 may test the fluid sample for water chemistry, corrosion inhibitors, and scale inhibitors. The user's request may include data fields for water chemistry and corrosion inhibitors. Based on the user's request, the generative AI model 112 may only extract the water chemistry information and the corrosion inhibitor information to the formatted database 114, and not extract the scale inhibitor information. This may facilitate the collection of only the information of interest, without extra, unrequested information. In this manner, the outputted formatted database may be structured and focused on the requested information. Other systems may utilize the extracted data from the formatted database 114. For example, as discussed in further detail herein, a product recommendation model may analyze the information in the formatted database 114 and prepare product recommendations based on the information in the formatted database 114. Including only the requested information in the formatted database 114 may further improve the accuracy and/or relevance of the product recommendations from the product recommendation model.

Figure 2:
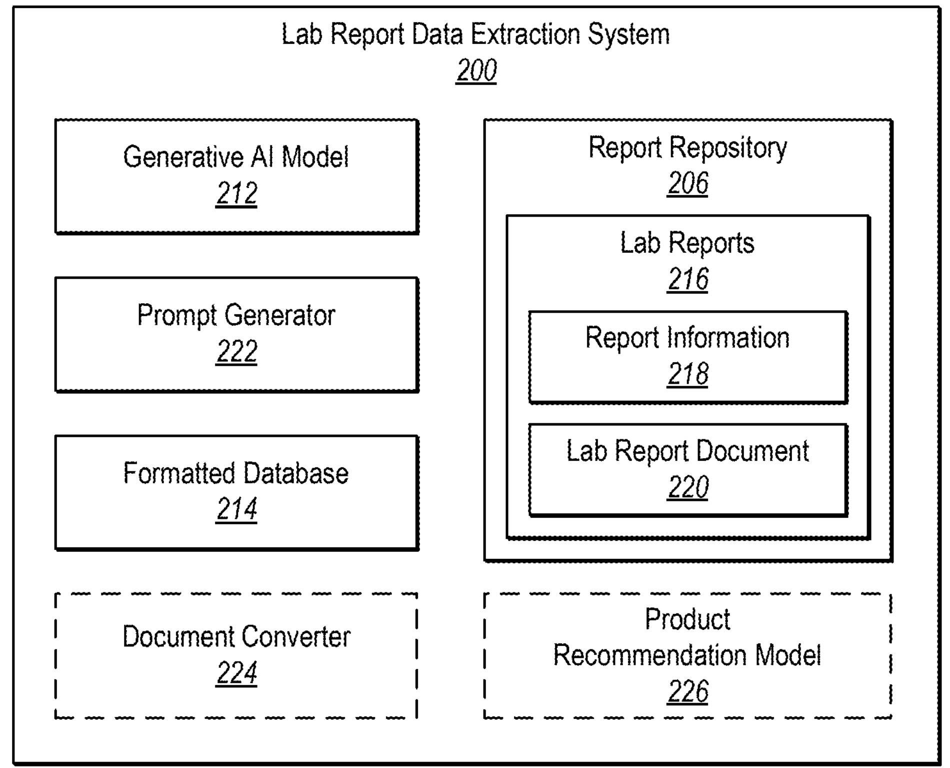
FIG. 2 is a schematic representation of a lab report data extraction system, according to at least one embodiment of the present disclosure.

FIG. 2 is a schematic representation of a lab report data extraction system 200, according to at least one embodiment of the present disclosure. Each of the components of the lab report data extraction system 200 can include software, hardware, or both. For example, the components can include one or more instructions stored on a computer-readable storage medium and executable by processors of one or more computing devices, such as a client device or server device. When executed by the one or more processors, the computer-executable instructions of the lab report data extraction system 200 can cause the computing device(s) to perform the methods described herein. Alternatively, the components can include hardware, such as a special-purpose processing device to perform a certain function or group of functions. Alternatively, the components of the lab report data extraction system 200 can include a combination of computer-executable instructions and hardware.

Furthermore, the components of the lab report data extraction system 200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The lab report data extraction system 200 may include a report repository 206. The report repository 206 may include a plurality of lab reports 216. The plurality of lab reports 216 may each include report information 218 stored in a lab report document 220. The report information 218 may be based on the particular test performed by the laboratory (e.g., the laboratory 104 of FIG. 1). For example, the report information 218 may include fluid sample information, including sample identification information, sample collection information, test results, and so forth, as discussed herein. The lab report document 220 may include the document itself, including the document file type and the document layout. Different lab reports 216 in the report repository 206 may be different in at least one of the report information 218 or the lab report document 220.

A generative AI model 212 may receive a request to extract at least a portion of the report information 218 from the lab reports 216 in the report repository 206. For example, the generative AI model 212 may receive, as an input, a prompt. The prompt may instruct the generative AI model 212 to extract the desired data from the report information 218. The generative AI model 212 may extract the requested data into a formatted database 214. For example, the generative AI model 212 may extract the requested data into the formatted database 214 having a particular structure, units, language, or format. In some examples, the formatted database 214 may include a database, a spreadsheet, or other organization.

In accordance with at least one embodiment of the present disclosure, a prompt generator 222 may generate the prompt to input to the generative AI model 212. For example, the prompt generator 222 may build a prompt based on input from the user. The user may input requested output data or output data fields to be extracted from the lab reports 216 in the report repository 206.

The prompt generated by the prompt generator 222 may be tailored to the particular generative AI model 212. For example, different generative AI models 212 may have different responses to particular language, phrasing, syntax, and grammar. The user may identify which generative AI model 212 will be applied to the prompt, and generate the prompt tailored to the particular generative AI model 212. This may improve the accuracy of the extraction of the data by the generative AI model 212.

In some embodiments, the prompt generator 222 may include a perspective or a point of view from which the generative AI model 212 should extract the data. For example, the prompt generator 222 may include language such as "You are an oilfield production chemistry expert," or "You are a laboratory technician specialized in testing fluid samples recovered from oil and gas production facilities." Including the perspective in the prompt may provide context for the generative AI model 212 to inform the interpretation of the data as it is extracted.

In some embodiments, the prompt generator 222 may include a description of the output data that the generative AI model 212 is to extract. For example, the prompt generator 222 may receive from the user the desired output data. The prompt generator 222 may prepare a description of the desired output data. For example, the prompt generator 222 may prepare a description of the name of the output data, alternative names of the output data, the units of the output data, the type of tests used to generate the output data, additives applied to the output data, any other description of the desired output data, and combinations thereof, including inclusions and exclusions of any of the foregoing. In some embodiments, the description of the output data may include a description of the sample, including a description regarding the location at which the sample was collected, the laboratory performing the tests, the technician performing the tests, the date and time at which the sample was collected, the date and time at which the test was performed, the name or type of test performed, any other description, and combinations thereof, including inclusions and exclusions of any of the foregoing. In some embodiments, the prompt may include a description that the lab report may include data or information not requested by the user. The prompt may include instructions to disregard at least one data field. In some embodiments, the prompt may include instructions to disregard one or more specific data fields. In some embodiments, the prompt may include instructions to disregard any data field that is not identified in the prompt. As a specific, non-limiting example, the prompt may include such language as "You will extract data regarding oilfield sample collection. The data to be collected will include sample collection location, sample collection date, testing laboratory location, test type, test date" and specific measured values or parameters.

In some embodiments, the prompt generator 222 may include step-by-step instructions regarding how to extract the data. For example, the prompt generator 222 may include instructions to read the lab report, identify data fields in the lab report, identify particular measured parameters or other information in the lab report, extract numerical values from the data fields, extract text values from the data fields, and so forth. In some embodiments, the prompt generator 222 may identify where in the lab report specific information is located. But as discussed herein, the prompt generator 222 may not identify where in the lab report specific information is located, and may include language instructing the generative AI model 212 to identify the output data in the lab reports regardless of the location in the lab reports. As a specific, non-limiting example, the prompt may include language such as "You will be given a lab report including multiple measured parameters. Identify, in the lab report, the following measurements," after which the prompt identifies the specific parameters to be extracted. The prompt may then continue "You will read through the lab report and extract the requested parameters." Such specific instructions in the prompt to identify and extract the parameters may facilitate accurate and reliable extraction of the requested output data from the lab reports. Indeed, the instructions may include instructions to identify the requested information even if the parameter has different names in different documents. As a specific, non-limiting example, the prompt may explain that a parameter called "Testing Pressure" may mean the pressure at which the test was performed, and it should be in a section or table that describes the test condition. The prompt may explain that the actual terminology in the document may vary, e.g., "Test Condition PSIA" or "Pressure Bar," or perhaps is labeled using a different language. In some embodiments, the prompt may be silent regarding alternative naming conventions to reduce limiting the analysis of the generative AI model 212. As discussed herein, the prompt generator 222 may generate a single prompt to be input to the generative AI model 212 to analyze multiple different lab reports. However, it should be understood that the techniques of the present disclosure may include multiple prompts generated for multiple different report types.

In some embodiments, the prompt generator 222 may include output data fields into which the generative AI model 212 is to extract the requested output data. The output data fields may be arranged in a specific arrangement and/or have a specific formatting. The prompt generator 222 may include in the prompt the requested output data fields. As a specific, non-limiting example, the prompt may include language such as "Below are detailed instructions for each data field in the formatted database. The property name in the lab report and in the formatted database may not be an exact match. You need to understand the meaning behind the title of the output data field in the formatted database and the meaning of the information in the lab report. For output data field 1, extract parameter 1 having units 1." The prompt may then continue the explanation of each of the output data fields, including output formatting, output units, and other aspects of the formatted database 214. Explicitly describing the content and formatting of the formatted database 214 may result in a structured database with information organized in a consistent formatting and units.

In some embodiments, the prompt generator 222 may provide relationships between data fields, including relationships between data fields in the report information 218 and the output data fields to be stored in the formatted database 214. For example, the prompt generator 222 may provide relationships between multiple inputs, including inputs related to fluid composition and measured properties, inputs related to operating conditions or conditions at the time of collection of the fluid sample, and inputs related to the testing conditions of the fluid sample. The prompt generator 222 may then indicate that a particular result of the testing was based on the identified inputs, such as recommended inhibitors or other additives, as well as the recommended dosing.

In some embodiments, the prompt generator 222 may include instructions regarding how to report errors in the extraction of data. For example, the prompt generator 222 may include instructions regarding how to report information that cannot be found in the report, information that is unclear because of the recording of the information, information that is unclear because the generative AI model 212 cannot identify the information, information that appears to be inaccurate based on other measurements, any other errors, and combinations thereof. The instructions may include any instruction, including to leave the output data field empty, report a null value, flag the output data field, link the output data field to the source lab report, any other instruction, and combinations thereof. As a specific, non-limiting example, the prompt may include language such as "If you cannot identify one of the requested values, perform the following actions," followed by the specific instructions. This may help facilitate error checking and error correction of data fields to which the generative AI model 212 cannot confidently identify.

In some embodiments, the prompt generator 222 may generate the prompt using a template. For example, the template may include pre-generated language for the prompt, and the user may input the requested information into the prompt. In some embodiments, the prompt generator 222 may include a generative AI model to generate the prompt. For example, the generative AI model may receive the user's requested data, including any relevant context provided by the user, and generate the prompt requested by the user. In some embodiments, the user may provide the output data fields for the formatted database 214, such as the spreadsheet or database file or database fields, to the prompt generator 222. The prompt generator 222 may generate the description of the output data fields based on the input information from the formatted database 214. Generating the prompt using a generative AI model may facilitate improved prompt generation by generating highly detailed prompts based on the user input provided to the prompt generator 222. In some embodiments, the prompt generator 222 may utilize the same generative AI model as the generative AI model 212. In some embodiments, the prompt generator 222 may utilize a different generative AI model than the generative AI model 212.

In some embodiments, the data outputted from the generative AI model 212 in the formatted database 214 may be checked or validated by a user. For example, a representative sample of extracted data may be collected and reviewed or validated by the user. The user may compare the data output to the associated lab report and determine whether the extracted data is representative of the data in the lab reports 216. In some embodiments, the user may instruct the prompt generator 222 to adjust the prompt based on their review of the extracted data. For example, the user may identify that two pressure measurements are being confused, or that the values are switched. The user may adjust the prompt generator 222 to clarify the identity of the pressure measurements that have been confused. In some embodiments, adjusting the prompt generator 222 may include adjusting the user input to the generative AI model utilized by the prompt generator 222. In some embodiments, adjusting the prompt generator 222 may include fine-tuning the generative AI model used by the prompt generator 222 based on the review by the user. In some embodiments, the review by the user may be used to fine-tune the generative AI model 212 that extracted the data from the lab reports 216.

In some embodiments, the generative AI model 212 may extract data from different lab reports 216 having different lab report documents 220 with different file formats. For example, the generative AI model 212 may be a multimodal model that may be trained to extract data from one or more of image data, text data, numerical data, spreadsheet data, any other data type, and combinations thereof, including inclusions or exclusions of any of the foregoing. In some embodiments, the generative AI model 212 may be trained on a general set of information, such as an LLM or other model trained on a massive database of general information. In some embodiments, the generative AI model 212 may include a model fine-tuned to extract information from various lab reports and other technical documents. In some embodiments, the generative AI model 212 may be fine-tuned on a sampling of lab reports 216 from the report repository 206.

In some embodiments, a document converter 224 may optionally convert the lab reports 216 from which the generative AI model 212 is to extract information to the same file format. As a specific, non-limiting example, the document converter 224 may convert multiple lab reports 216 to an image file. The generative AI model 212 may extract the requested information from the image file. For example, the generative AI model 212 may recognize text from image files. Converting the lab reports 216 to the same file type may facilitate increased accuracy of the outputted data from the generative AI model 212.

In some embodiments, a product recommendation model 226 may use the formatted or structured data from the formatted database 214 to generate a recommendation for a particular product. The product recommendation model 226 may include a machine learning model or AI model that may identify insights from the formatted database 214 to prepare product recommendations for additives or other products to be used in oil and gas operations. In some embodiments, the product recommendation model 226 may be trained using the formatted database 214.

The product recommendation model 226 may generate a recommendation for any type of product. For example, the product recommendation model 226 may include a scale inhibitor recommendation model to recommend a scale inhibitor to prevent or reduce the formation of scale deposits. In some examples, the product recommendation model 226 may include a corrosion inhibitor recommendation model to recommend a corrosion inhibitor to protect metal components of the production infrastructure from corrosive fluid substances. In some examples, the product recommendation model 226 may include an asphaltene inhibitor recommendation model to recommend an asphaltene inhibitor to prevent the precipitation and deposition of asphaltenes that can clog production flowlines and equipment. In some examples, the product recommendation model 226 may include a hydrate inhibitor recommendation model that may recommend one or more of thermodynamic inhibitors or kinetic inhibitors and anti-agglomerants to prevent the formation of gas hydrates that can block flowlines under high pressure and low temperature. In some examples, the product recommendation model 226 may include a paraffin inhibitor recommendation model to recommend a paraffin inhibitor to prevent the precipitation of paraffin waxes in crude oil, which may lead to pipeline blockages. In some examples, the product recommendation model 226 may include a biocide recommendation model to recommend a biocide to control microbial growth that may result in biofouling, souring, and microbiologically influenced corrosion (MIC) in production systems.

In some embodiments, each of the product recommendation models 226 may be a separate model. In some embodiments, the lab report data extraction system 200 may generate a separate formatted database 214, or a separate spreadsheet or database in the formatted database 214 for each of the product recommendation models 226. For example, each product may impact or be impacted by different parameters tested in the lab reports. The lab report data extraction system 200 may facilitate the collection of the relevant information for a particular product recommendation model 226, while limiting the formatted database 214 for the product recommendation model 226 to information not relevant to the associated product. As a specific, non-limiting example, the formatted database 214 for the paraffin inhibitor product recommendation model 226 may include oil chemistry data and associated paraffin inhibitor products. The user may exclude irrelevant information, such as water chemistry, scale inhibitor tests, biocides, and so forth. Because some fluid samples may include multiple elements that are tested, the same lab report 216 may be used to extract different information for different entries in the formatted database 214 or for different formatted databases 214.

In some embodiments, the user may include seemingly irrelevant information to determine whether there is a correlation, however small, between parameters. For example, the user may include extraction of parameters that are commonly not considered (or unknown) as being correlated. The techniques of the present disclosure may facilitate the identification of a correlation. For example, the impact of bath temperature and finger temperature of a cold finger test for paraffin deposition is unclear on the resulting inhibition efficiency. The formatted database 214 may include the typically irrelevant or unconsidered information to determine whether there is even a small correlation with paraffin formation.

Figure 3:
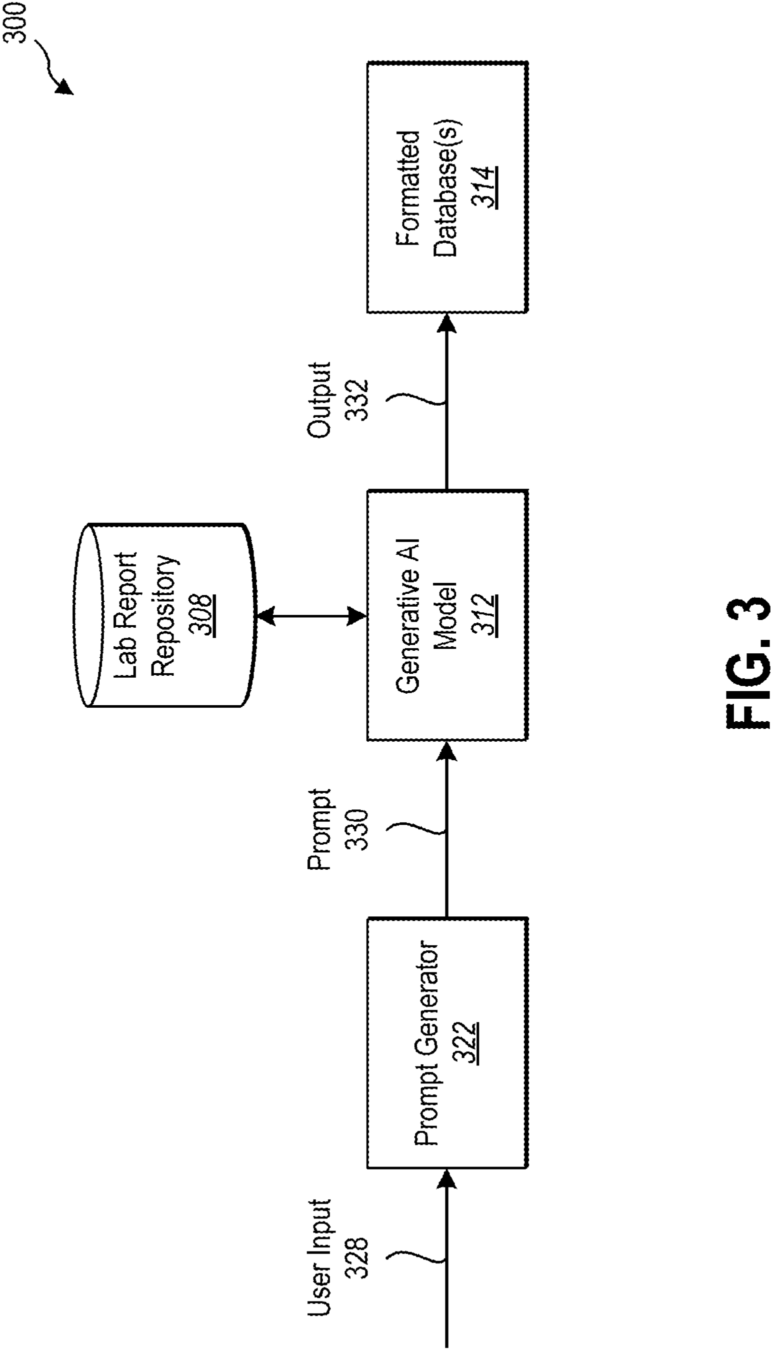
FIG. 3 is a flow diagram of a lab report data extraction system, according to at least one embodiment of the present disclosure.

FIG. 3 is a flow diagram of a lab report data extraction system 300, according to at least one embodiment of the present disclosure. In the lab report data extraction system 300, a prompt generator 322 may receive a user input 328. The user input 328 may specify the requested output data. In some embodiments, the user input 328 may include a format of the output including output data fields. In some embodiments, the user input 328 may identify particular lab reports from a lab report repository 308. For example, the user input 328 may identify lab reports having a particular subject matter, lab reports that utilize one or more specific tests, lab reports originating from a particular geographical location, any other lab reports, and combinations thereof.

The user input 328 may be any type of user input. For example, the user input 328 may include plain language. In some examples, the user input 328 may be an input to one or more fields of a software application. In some examples, the user input 328 may be any other input or input data.

As discussed herein, the prompt generator 322 may generate a prompt 330 based on the user input 328. For example, the prompt generator 322 may generate the prompt 330 to input to a generative AI model 312. The prompt generator 322 may arrange the user input 328 into the prompt 330 to cause the generative AI model 312 to identify and/or retrieve lab reports from the lab report repository 308. The prompt 330 may further cause the generative AI model 312 to extract the data specified in the user input 328.

The generative AI model 312 may receive the prompt 330 as the input and generate an output 332 including the output data. The generative AI model 312 may store the output 332 in a formatted database 314. For example, the generative AI model 312 may store the output 332 in the formatted database 314 having a particular predetermined data format, or a predetermined set of output data fields. In this manner, the lab report data extraction system 300 may extract data from the lab report repository 308 to store in a common format, with common units, language, and formatting.

Figure 4:
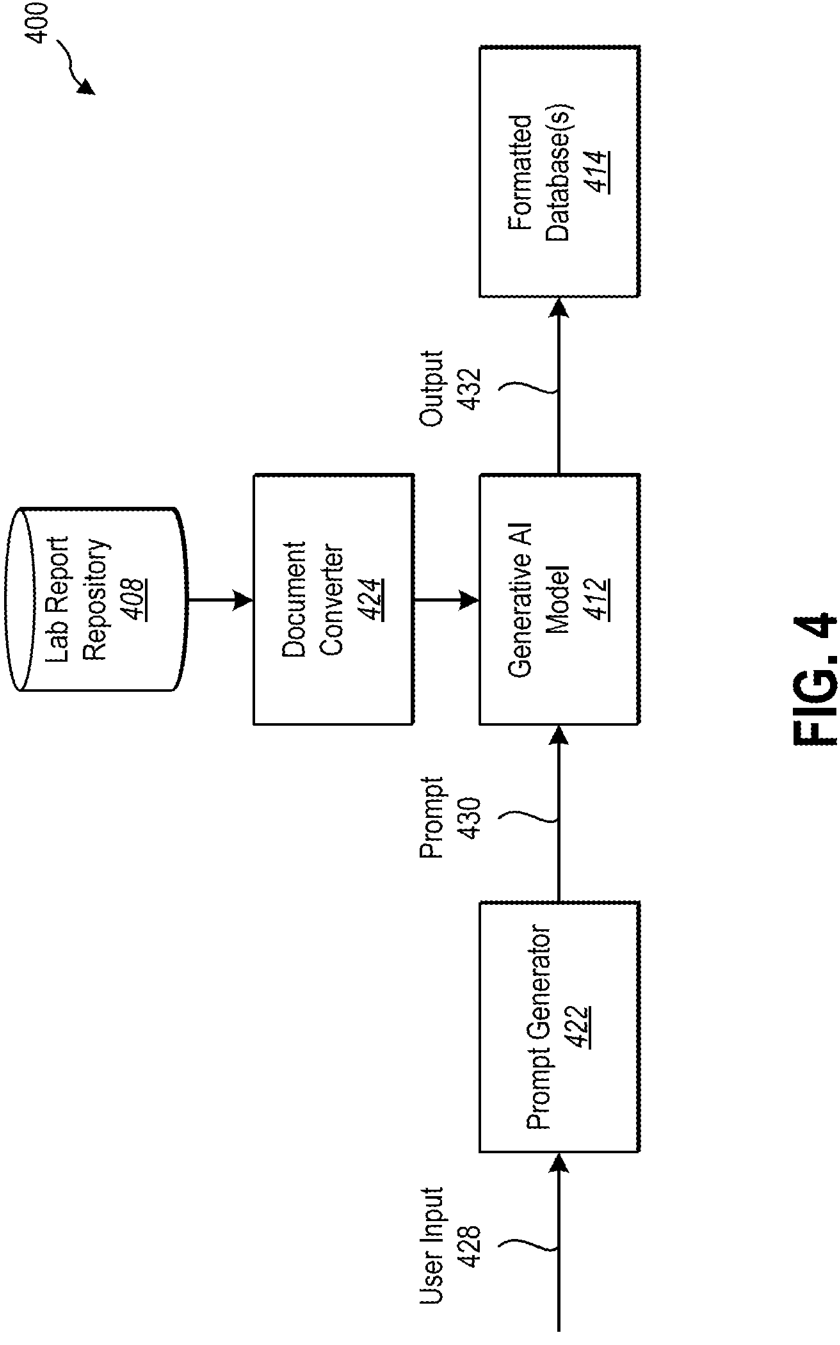
FIG. 4 is a flow diagram of a lab report data extraction system, according to at least one embodiment of the present disclosure.

FIG. 4 is a flow diagram of a lab report data extraction system 400, according to at least one embodiment of the present disclosure. In the lab report data extraction system 400, a prompt generator 422 may receive a user input 428. The user input 428 may specify the requested output data, and may specify output data fields or identify one or more lab reports from a lab report repository 408. The user input 428 may be any type of user input, including plain language input or input into a software application.

As discussed herein, the prompt generator 422 may generate a prompt 430 based on the user input 428. For example, the prompt generator 422 may generate the prompt 430 to input to a generative AI model 412. The prompt generator 422 may arrange the user input 428 into the prompt 430 to cause the generative AI model 412 to identify and/or retrieve lab reports from the lab report repository 408 and extract the data specified in the user input 428.

In some embodiments, a document converter 424 may convert lab reports from the lab report repository 408 to a common file format. For example, the document converter 424 may convert lab reports to file formats that the generative AI model 412 may be trained to analyze, such as text documents, image documents, and so forth.

The generative AI model 412 may receive the prompt 430 as the input and generate an output 432 including the output data. The generative AI model 412 may store the output 432 in a formatted database 414. In this manner, the lab report data extraction system 400 may extract data from the lab report repository 408 to store in a common format, with common units, language, and formatting.

Figure 5:
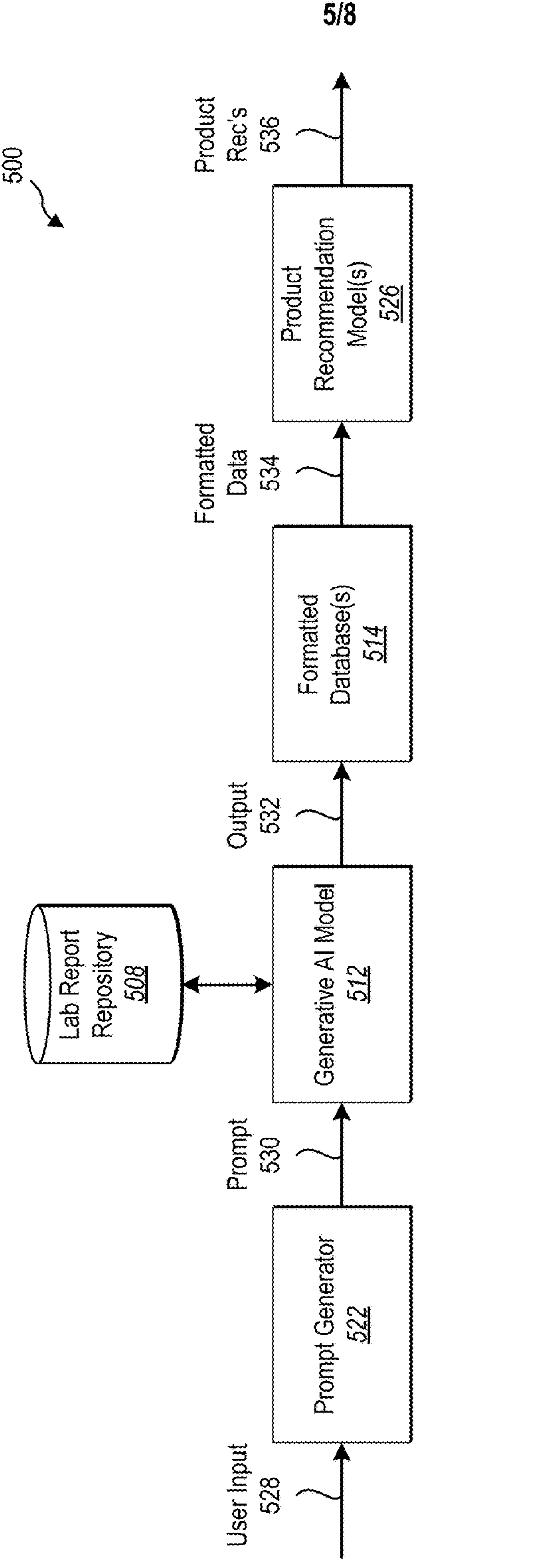
FIG. 5 is a flow diagram of a lab report data extraction system, according to at least one embodiment of the present disclosure.

FIG. 5 is a flow diagram of a lab report data extraction system 500, according to at least one embodiment of the present disclosure. In the lab report data extraction system 500, a prompt generator 522 may receive a user input 528. The user input 528 may specify the requested output data, and may specify output data fields or identify one or more lab reports from a lab report repository 508. The user input 528 may be any type of user input, including plain language input or input into a software application.

As discussed herein, the prompt generator 522 may generate a prompt 530 based on the user input 528. For example, the prompt generator 522 may generate the prompt 530 to input to a generative AI model 512. The prompt generator 522 may arrange the user input 528 into the prompt 530 to cause the generative AI model 512 to identify and/or retrieve lab reports from the lab report repository 508 and extract the data specified in the user input 528.

The generative AI model 512 may receive the prompt 530 as the input and generate an output 532 including the output data. The generative AI model 512 may store the output 532 in a formatted database 514. In this manner, the lab report data extraction system 500 may extract data from the lab report repository 508 to store in a common format, with common units, language, and formatting.

A product recommendation model 526 may receive formatted data 534 from the formatted database 514. In some embodiments, the product recommendation model 526 may be trained on the formatted data 534 from the formatted database 514. For example, the product recommendation model 526 may be trained to identify correlations between the data stored in the formatted data 534. In some examples, the product recommendation model 526 may be trained to prepare product recommendations 536 for one or more products, as discussed in further detail herein.

Figure 6:
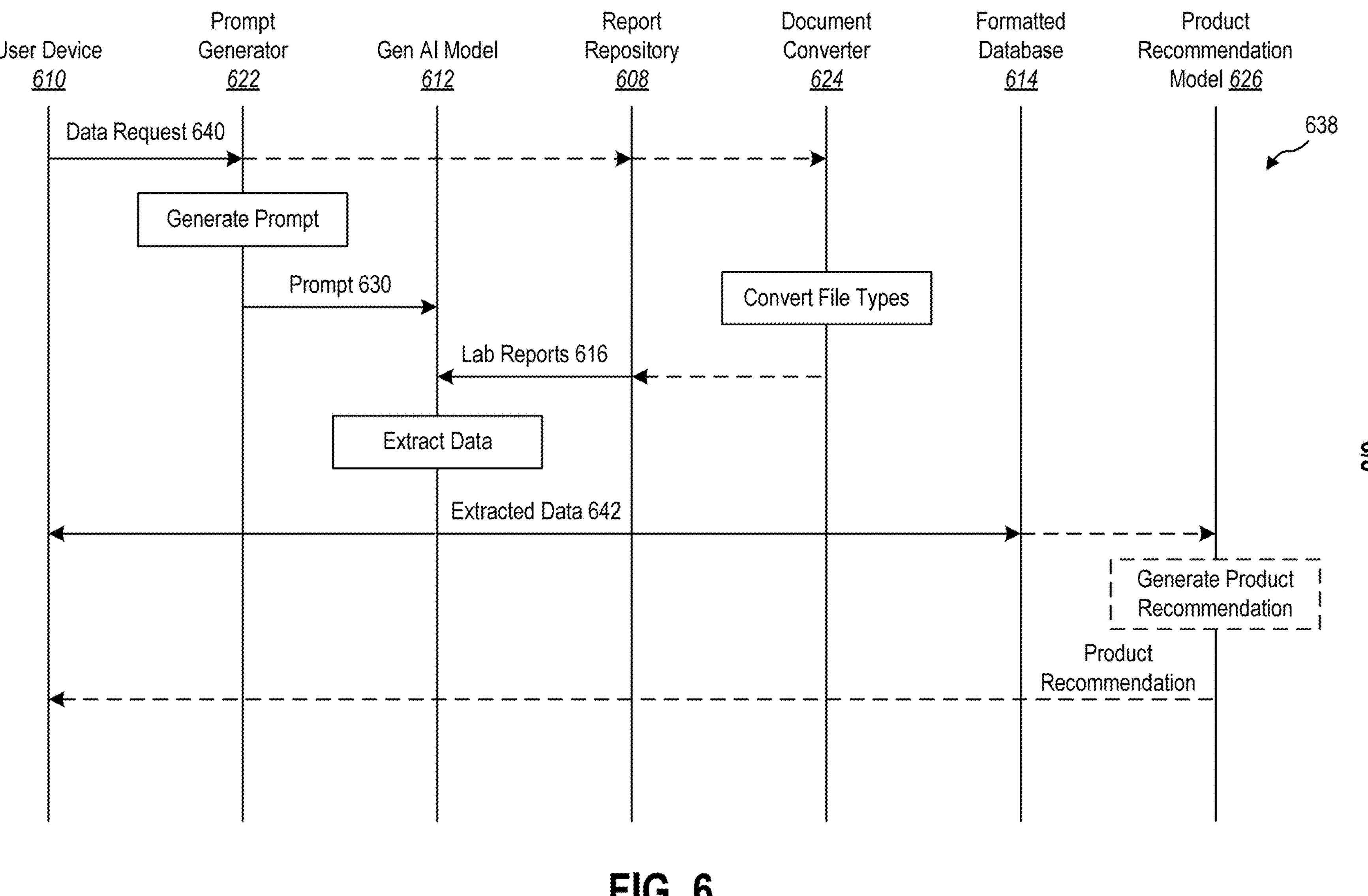
FIG. 6 is a string diagram representative of a lab report data extraction system, according to at least one embodiment of the present disclosure.

FIG. 6 is a string diagram 638 representative of a lab report data extraction system, according to at least one embodiment of the present disclosure. A user may provide a user input to a user device 610. The user input may include a data request 640 that requests output data from a generative AI model 612. A prompt generator 622 may receive the data request 640. The prompt generator 622 may generate a prompt 630. The prompt 630 may be provided as input to the generative AI model 612.

The generative AI model 612 may receive, from a report repository 608, one or more lab reports 616. In some embodiments, the generative AI model 612 may receive the raw lab reports 616, as saved or stored in the report repository 608. In some embodiments, a document converter 624 may optionally convert the lab reports into a consistent file format. In some embodiments, the user device 610 may retrieve the lab reports 616 from the report repository 608 and provide the lab reports 616 to the generative AI model 612. For example, the data request 640 may include an identification of the types of lab reports that may include the desired output information which may be retrieved from the report repository 608. In some embodiments, the data request 640 may further include a file type and instruct the document converter 624 to convert the lab reports 616 to the predetermined file type.

The generative AI model 612 may extract the requested data. The generative AI model 612 may store the extracted data 642 in a formatted database 614 in the predetermined format. In some embodiments, the generative AI model 612 may provide the extracted data 642 to the user device 610 for review by the user.

In some embodiments, the lab report data extraction system may optionally include a product recommendation model 626 that may be trained to generate product recommendations 636 and provide the product recommendations to the user device 610.

Figure 7:
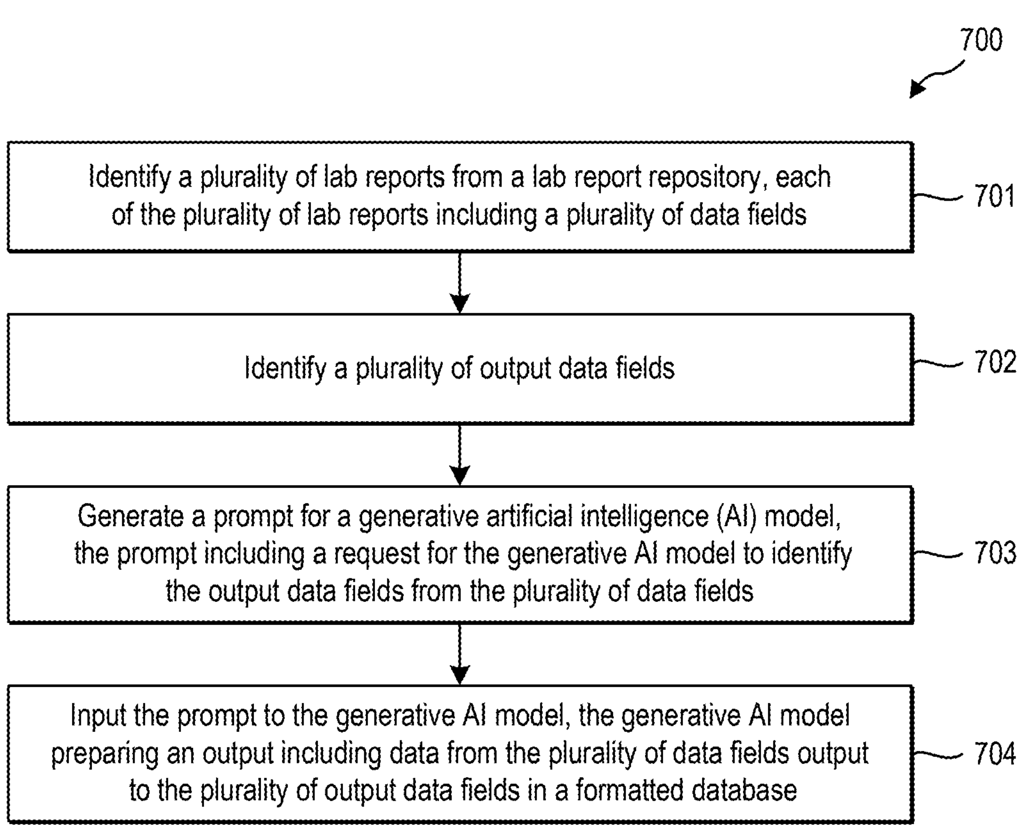
FIG. 7 is a flowchart of a method for extracting data from lab reports, according to at least one embodiment of the present disclosure.
Figure 8:
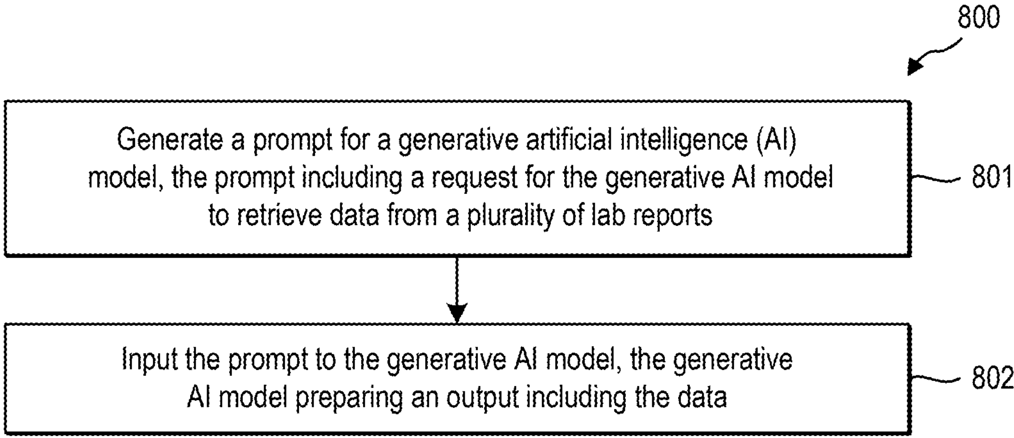
FIG. 8 is a flowchart of a method for extracting data from lab reports, according to at least one embodiment of the present disclosure.

FIG. 7 and FIG. 8, the corresponding text, and the examples provide a number of different methods, systems, devices, and computer-readable media of the lab report data extraction system. In addition to the foregoing, one or more embodiments can also be described in terms of flowcharts comprising acts for accomplishing a particular result, as shown in FIG. 7 and FIG. 8. FIG. 7 and FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts or a method 700 for retrieving data from a lab report repository, according to at least one embodiment of the present disclosure. While FIG. 7 illustrates acts according to one embodiment, alternative embodiments may omit, add to, reorder, and/or modify any of the acts shown in FIG. 7. The acts of FIG. 7 can be performed as part of a method. Alternatively, a computer-readable medium can comprise instructions that, when executed by one or more processors, cause a computing device to perform the acts of FIG. 7. In some embodiments, a system can perform the acts of FIG. 7.

The lab report data extraction system may identify a plurality of lab reports from a lab report repository at 701. Each of the plurality of lab reports includes a plurality of data fields. The lab report data extraction system may identify a plurality of output data fields at 702. The lab report data extraction system may generate a prompt for a generative AI model at 703. The prompt includes a request for the generative AI model to identify the output data fields from the plurality of data fields. The lab report data extraction system inputs the prompt to the generative AI model at 704. The generative AI model prepares an output including data from the plurality of data fields outputted to the plurality of output data fields in a formatted database.

In some embodiments, generating the prompt includes specifying an output format. In some embodiments, generating the prompt includes providing a point of view for the generative AI model to prepare the output. In some embodiments, generating the prompt includes providing instructions to disregard at least one data field of the plurality of data fields. In some embodiments, generating the prompt includes identifying, in the prompt, for the output data fields, testing conditions for the lab report.

In some embodiments, at least two of the plurality of lab reports have different data fields in the plurality of data fields. In some embodiments, the data is located in different locations in at least two of the plurality of lab reports. In some embodiments, at least two of the plurality of lab reports include different types of products used in the plurality of lab reports. In some embodiments, identifying the plurality of output data fields may include identifying a subset of the plurality of data fields.

In some embodiments, identifying the plurality of output data fields includes identifying the plurality of output data fields from a product recommendation model. In some embodiments, the lab report data extraction system may generate a product recommendation by applying the product recommendation model to the plurality of output data fields.

As mentioned, FIG. 8 illustrates a flowchart of a series of acts or a method 800 for retrieving data from a lab report repository, according to at least one embodiment of the present disclosure. While FIG. 8 illustrates acts according to one embodiment, alternative embodiments may omit, add to, reorder, and/or modify any of the acts shown in FIG. 8. The acts of FIG. 8 can be performed as part of a method. Alternatively, a computer-readable medium can comprise instructions that, when executed by one or more processors, cause a computing device to perform the acts of FIG. 8. In some embodiments, a system can perform the acts of FIG. 8.

A lab report data extraction system generates a prompt for a generative AI model at 801. The prompt includes a request for the generative AI model to retrieve data from a plurality of lab reports. The prompt is input to the generative AI model at 802. The generative AI model prepares an output including the data extracted by the generative AI model at 802.

In some embodiments, the lab report data extraction system converts at least one of the plurality of lab reports to an image file. In some embodiments, the generative AI model includes image processing to identify the data in the plurality of lab reports.

In some embodiments, generating the prompt includes identifying an output format for the data. In some embodiments, the generative AI model stores the output in the output format. In some embodiments, the data includes a subset of data available in the plurality of lab reports. In some embodiments, the lab report data extraction system validates the data by comparing the data extracted by the generative AI model to the associated lab report.

Figure 9:
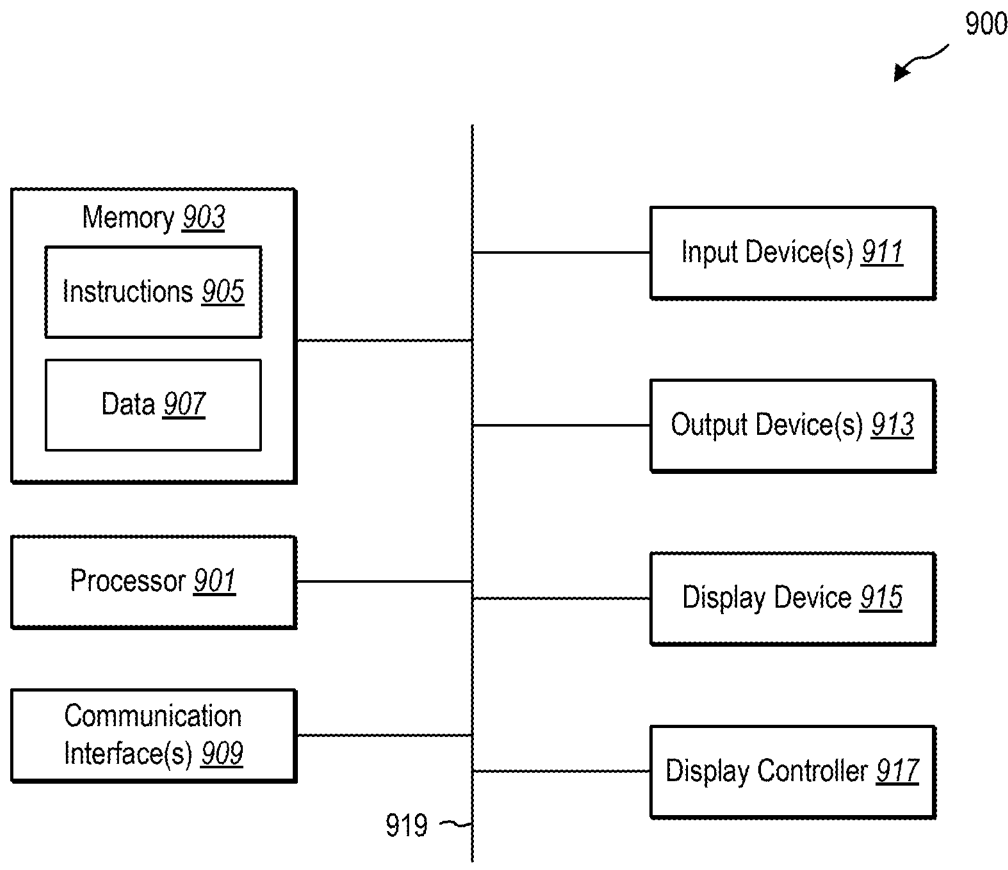
FIG. 9 is a representation of a computing system, according to at least one embodiment of the present disclosure.

FIG. 9 illustrates certain components that may be included within a computer system 900. One or more computer systems 900 may be used to implement the various devices, components, and systems described herein.

The computer system 900 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for retrieving data from a lab report repository, the method comprising:

identifying a plurality of lab reports from a lab report repository, each of the plurality of lab reports including a plurality of data fields, at least two of the plurality of lab reports being different in at least one of: formatting, units, language, or file type;

identifying a plurality of output data fields;

generating a prompt for a generative artificial intelligence (AI) model, the prompt including a request for the generative AI model to identify the plurality of output data fields from the plurality of data fields, the generating the prompt further including:

preparing a description of the output data of the plurality of output data fields, the output data comprising a name of the output data, alternative names of the output data, units of the output data, and a type of one or more tests used to generate the output data; and including instructions regarding how to report errors in extraction of data by leaving an output data field empty, reporting a null value, or flagging the output data field;

converting at least one of the plurality of lab reports to an image file;

inputting the prompt to the generative AI model, the generative AI model including image processing to identify data in the plurality of lab reports;

preparing, by the generative AI model, an output including data from the plurality of data fields output to the plurality of output data fields in a formatted database, the formatted database having a predetermined data format with common units, language, and formatting; and validating the data from the plurality of data fields by comparing the data extracted by the generative AI model to an associated lab report.

2. The method of claim 1, wherein the generating the prompt further includes specifying an output format.

3. The method of claim 1, wherein the generating the prompt further includes providing a point of view for the generative AI model to prepare the output.

4. The method of claim 1, wherein the generating the prompt further includes providing instructions to disregard at least one data field of the plurality of data fields.

5. The method of claim 1, wherein the generating the prompt further includes identifying in the prompt, for the plurality of output data fields, testing conditions for the at least one of the plurality of lab reports.

6. The method of claim 1, wherein at least one of the plurality of lab reports includes hand-written information or a different arrangement of information than another of the plurality of lab reports.

7. The method of claim 1, wherein each of at least two of the plurality of lab reports includes a different set of data fields among the plurality of data fields.

8. The method of claim 1, wherein the output data of the plurality of output data fields is located in different locations in at least two of the plurality of lab reports.

9. The method of claim 1, wherein each of at least two of the plurality of lab reports includes an analysis of a different inhibitor on properties of a fluid.

10. The method of claim 1, wherein the plurality of output data fields include a subset of the plurality of data fields.

11. The method of claim 1, wherein identifying the plurality of output data fields includes identifying the plurality of output data fields associated with a product recommendation model.

12. The method of claim 11, further comprising generating a product recommendation by applying the product recommendation model to the data from the plurality of data fields.

13. The method of claim 1, further comprising converting the plurality of lab reports into a consistent file format.

14. One or more non-transitory computer-readable media storing instructions that, when executed by at least one processor of a computing system, cause the computing system to perform operations for retrieving data from a lab report repository, the operations comprising:

converting, by a document converter, a plurality of lab reports from the lab report repository into a predetermined file type comprising an image file, the converting facilitating analysis of lab reports having different document formats;

generating, by a prompt generator, a prompt for a generative artificial intelligence (AI) model, the prompt including a request for the generative AI model to retrieve data from the plurality of lab reports, the generating the prompt further including:

providing a point of view for the generative AI model to retrieve the data;

including step-by-step instructions regarding how to extract the data by instructing the generative AI model to read the plurality of lab reports and extract requested parameters;

preparing a description of requested output data from the plurality of lab reports, the output data including a name of the output data, alternative names of the output data, units of the output data, and a type of one or more tests used to generate the output data; and including instructions regarding how to report errors in extraction of data by leaving an output data field empty, reporting a null value, flagging the output data field, or linking the output data field to a source lab report;

inputting the prompt to the generative AI model, the generative AI model including image processing to identify the data in the plurality of lab reports, regardless of a location of the data within the plurality of lab reports; and storing, in an output format specified by the prompt, an output prepared by the generative AI model and including the retrieved data, the storing producing a machine-readable data structure usable by one or more downstream computer processes.

15. The one or more non-transitory computer-readable media of claim 14, wherein the converting at least one of the plurality of lab reports to an image file includes converting each page of the at least one of the plurality of lab reports to a corresponding image.

16. The one or more non-transitory computer-readable media of claim 15, wherein the image processing includes recognizing text from the image file to identify the data.

17. The one or more non-transitory computer-readable media of claim 14, wherein the generating the prompt further includes identifying an output format for the data.

18. The one or more non-transitory computer-readable media of claim 17, wherein the operations further comprise storing the output in the output format.

19. The one or more non-transitory computer-readable media of claim 14, wherein the data includes a subset of data available in the plurality of lab reports.

20. The one or more non-transitory computer-readable media of claim 14, wherein the operations further comprise validating the data by comparing the data output by the generative AI model to the plurality of lab reports.

21. The one or more non-transitory computer-readable media of claim 20, wherein the validating the data includes:

collecting a representative sample of extracted data; and reviewing or validating, by a user, the representative sample by comparing the data output to an associated lab report.

22. A system, comprising:

a processor; and memory including instructions that cause the processor to:

identify a plurality of lab reports from a lab report repository, each of the plurality of lab reports including a plurality of data fields, at least two of the plurality of lab reports being different in at least one of: formatting, units, language, or file type;

identify a plurality of output data fields;

generate a prompt for a generative artificial intelligence (AI) model, the prompt including a request for the generative AI model to identify the output data fields from the plurality of data fields, the generating the prompt further including:

preparing a description of the output data including a name of the output data, alternative names of the output data, units of the output data, and a type of one or more tests used to generate the output data; and including instructions regarding how to report errors in extraction of data by leaving an output data field empty, reporting a null value, or flagging the output data field;

input the prompt to the generative AI model, the generative AI model including image processing to identify data in the plurality of lab reports;

preparing, by the generative AI model, an output including data from the plurality of data fields output to the plurality of output data fields in a formatted database, the formatted database having a predetermined data format with common units, language, and formatting; and validating the data by comparing the data extracted by the generative AI model to an associated lab report.

* * * * *